United States Patent Office 3,658,808
Patented Apr. 25, 1972

3,658,808
METHOD OF MAKING 2-BENZOTHIAZOLE
SULFENAMIDES
Robert Chalk Kinstler, Somerville, N.J., assignor to
American Cyanamid Company, Stamford, Conn.
No Drawing. Filed Jan. 2, 1968, Ser. No. 694,834
Int. Cl. C07d 91/44
U.S. Cl. 260—247.1                         9 Claims

ABSTRACT OF THE DISCLOSURE

A process for making high purity sulfenamides represented by Formula I:

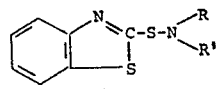

I wherein R can be hydrogen or lower alkyl, R' can be lower alkyl or cycloalkyl and together R and R' can form the remainder of an N-heterocycle moiety such as piperidino, morpholino and the like. The Formula I compound is obtained by reacting, in the presence of a hydrogen chloride acceptor, either 2-mercaptobenzothiazole or 2,2'-dithiobisbenzothiazole with an N-chloroamino organic compound represented by Formula II:

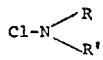

II wherein R and R' are as defined above. An excess of benzothiazole reactant is maintained in the reaction mixture until reaction is complete.

---

This invention relates to a process for producing high purity, storage-stable sulfenamides. More particularly, this invention relates to a process for producing high purity sulfenamides by reaction of either 2-mercaptobenzothiazole (hereinafter designated MBT) or 2,2'-dithiobisbenzothiazole (hereinafter designated MBTS) and an N-chloroamino organic compound.

At the present time, there are available various sulfenamides which are very useful as rubber chemicals and especially as vulcanization accelerators. Particularly useful sulfenamides are 2-(morpholinothio)benzothiazole, N-cyclohexyl - 2 - benzothiazolesulfenamide and N-(t-butyl)-2-benzothiazole-sulfenamide. The effectiveness of these sulfenamides as rubber vulcanizers is seriously inhibited by MBTS, the presence of which detracts from the important delayed action property of sulfenamide accelerators in rubber vulcanization.

The benzothiazolesulfenamides produced by presently known processes including present commercial processes contain undesirably large amounts of MBTS. For example, one present commercial process for producing 2-(morpholinothio) benzothiazole involves the addition of MBT to a solution containing N-chloromorpholine and morpholine. The N-chloromorpholine reacts with MBT while the morpholine acts as a hydrogen chloride acceptor. The mixture is heated until reaction is complete and the product is recovered. The morpholine hydrochloride is recovered and converted to N-chloromorpholine for use as the starting material. The product obtained by this process contains MBTS impurity in undesirably large amounts sufficient to adversely affect the use of the product as a rubber vulcanizer. Furthermore, the 2-(morpholinothio)benzothiazole produced by presently employed processes does not have satisfactory storage stability. While sulfenamide products can be treated to remove MBTS by various methods including repeated recrystallization, these methods are not commercially attractive since they are time consuming, require expensive process control, necessitate impractical reaction volumes and result in product losses.

Furthermore, in present processes, 2-(morpholinothio) benzothiazole is recovered by first adding anhydrous ammonia to the reaction mixture. The ammonia reacts with morpholine hydrochloride to form morpholine and ammonium chloride crystals. The ammonium chloride is recovered by filtration while the free morpholine remains in solution with the product. Molten 2-(morpholinothio) benzothiazole which is thereafter flaked is obtained by evaporating the solvent. The solvent containing free morpholine is condensed and recycled to a chlorination reaction step. In the chlorination step, morpholine is reacted with an aqueous hypochlorite to form N-chloromorpholine. The N-chloromorpholine is relatively insoluble in water and is recovered by decantation.

Unfortunately, the 2-(morpholinothio)benzothiazole obtained by procedures employing ammonia in the recovery steps are not storage stable and contain undesirably high concentrations of MBTS. Furthermore, the product solution retained as wetness in the ammonium chloride filter cake is presently recovered, either by thorough washing with solvent, causing a great increase in volume of solvent to be recovered by evaporation, or by dissolving the cake in water and decanting the product solution from the ammonium chloride brine. In the latter scheme any excess hydrogen chloride acceptor still present along with the product solution is lost due to its preferential solubility in water.

It is an object of the present invention to provide a process for producing relatively pure, storage-stable sulfenamide compounds. It is a further object of the present invention to provide a process for producing relatively pure, storage-stable sulfenamide compounds without employing sulfenamide product purification steps subsequent to reaction. It is a further object of the present invention to provide a process for producing sulfenamides whereby by-products are converted to reactant starting materials.

The present invention provides a process for producing relatively pure, storage stable sulfenamides represented by Formula I:

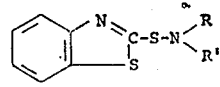

wherein R can be either hydrogen or lower alkyl, R' can be lower alkyl or cycloalkyl or together R and R' can form the remainder of a N-heterocycle moiety such as piperidino, morpholino and the like. The compounds of Formula I are obtained by reacting, in the presence of a hydrogen chloride acceptor, either 2-mercaptobenzothiazole or 2,2'-dithiobisbenzothiazole with an N-chloroamino organic compound represented by Formula II:

II wherein R and R' are defined above. An excess of benzothiazole reactant is maintained in the reaction mixture until the reaction is complete. The main by-product of the reaction is the hydrochloride of the amine acceptor employed which can be chlorinated to produce the N-chloroamino organic starting material.

Unexpectedly, a greatly improved product is obtained by maintaining an excess of benzothiazole reactant throughout the reaction or conversely maintaining the reaction mixture so that there is no free N-chloroamino organic compound present, and by not reacting the hydrochloride by-product with ammonia in the presence of the sulfenamide product. This is in contrast to the prior art as exemplified by U.S. Pats. 2,730,527 and 2,840,556 and present commercial practice wherein the benzothiazole reactant is added to a liquid mixture containing N-chloromorpholine and morpholine so that excess N-chloromorpholine is present during reaction and anhydrous ammonia is employed in the recovery steps. It has been found that the sulfenamides produced by the process of this invention contain extremely small amounts of or no MBTS and are very storage-stable. Furthermore, the sulfenamides are obtained directly from the reaction step after removing solvents and by-products and do not require additional purification. Thus, the process of this invention provides distinct and substantial advantages over the prior art processes.

In accordance with the present invention, the reactants are mixed to ensure an excess of benzothiazole reactant until reaction is complete. This is accomplished by carefully adding the N-chloroamino organic compound to the benzothiazole reactant in the presence of a solvent and a hydrogen chloride acceptor until substantially complete reaction of each reactant is attained. Thus, the N-chloroamino organic compound can be dissolved in a solvent which is inert to the reactants under the reaction conditions while the benzothiazole reactant is separately mixed with the hydrogen chloride acceptor. The solvent solution is then added to the mixture containing the benzothiazole reactant in a manner so that the benzothiazole reactant is maintained in excess until reaction is complete or conversely so that there is no free N-chloroamino organic compound in the reaction mixture. The reaction-stoichiometry is maintained at 1.0 mole of hydrogen chloride acceptor and 0.5 mole each of the benzothiazole and N-chloroorganoamine reactant. The end point of the reaction is approached carefully to insure the complete disappearance of MBTS. At the end of the reaction there will be a very slight excess of the N-chloroamine organic reactant which is quickly reacted by the addition of a stoichiometric amount of the benzothiazole reactant. When the reaction is near to completion, the reaction mixture is tested to determine whether an excess of the N-chloroamino organic reactant is present. For example, the presence of excess N-chloroamino organic reactant can be easily determined by adding some of the reaction mixture to starch-potassium iodide paste. If the mixture turns blue, it is an indication that excess N-chloroamino organic reactant is present. To react the excess reactant a small amount of benzothiazole reactant is added to the reaction mixture until a sample of the reaction mixture will no longer form a blue spot on starch-potassium iodide paste.

In conjunction with the above described process of this invention, additional steps can be employed to insure an excess of benzothiazole reactant in the reaction mixture until reaction is complete. A small amount of an inorganic alkali metal or alkaline earth metal compound in anhydrous form can be added to the reaction mixture. The added alkali reacts with the hydrochloride salt of the hydrogen halide acceptor to form alkali metal or alkaline earth metal chloride and some of the free organic hydrogen chloride acceptor. The free hydrogen chloride acceptor insures that the reaction is driven to the end point. The amount of inorganic alkali metal or alkaline earth metal compound which is added is usually in the range of between about 0.05 and 0.20 mole per mole of benzothiazole. Exemplary inorganic alkali metal or alkaline earth metal compounds which can be employed are sodium carbonate, potassium carbonate, sodium bicarbonate, sodium hydroxide and potassium hydroxide.

The reaction is carried out under conditions which are dependent upon the particular reactants employed. Thus the reaction is carried out at a temperature so as to effect desirable reaction rates while not thermally degrading the product or reactants and not distilling solvent. Reaction temperatures can be mainained between about 0° C. and about 80° C., preferably between about 20° C. and about 60° C.

It is preferred to use, as a hydrogen chloride acceptor, the non-chlorinated homologue of the N-chloroamino organic compound. During the reaction, the corresponding hydrochloride is produced as a by-product and subsequently can be recovered. The hydrochloride can then be converted to the N-chloro organoamine starting material by reaction with an alkali metal hypochlorite.

The organic solvent employed in the process of the present invention is inert to the reactants under the mild reaction conditions. Among the suitable solvents which can be employed are chlorinated aliphatic hydrocarbons such as carbon tetrachloride and trichloroethylene; benzene and its homologues and their halogenated derivatives thiophene, nitrobenzene, and the like. Hydrocarbons and halogenated hydrocarbons of the benzene series, especially toluene and monochlorobenzene, have been found to be particularly suitable solvents.

Suitable N-chloroamino organic compounds which can be employed as reactants in the process of the present invention include heterocycle compounds containing nitrogen in the ring such as N-chloromorpholine, N-chloro-2,6-dimethylmorpholine and N-chloropiperidine; cycloalkyl compounds such as N-chlorocyclohexyl amine and N-chlorocyclopentyl amine; alkylamines such as N-chlorotertiary butylamine, N-chloroisopropylamine, N-chlorodiethanolamine, and the like.

After the reaction is completed, the reaction mixture is mixed with water to dissolve the hydrochloride salt of the acceptor and any alkali or alkaline metal chloride. The sulfenamide product remains dissolved in the solvent and the solvent solution is decanted from the aqueous layer. The solvent is evaporated, usually under vacuum, at a temperature between about 60° C. and about 120° C. to leave the product as a residue. The solvent is condensed and can be reused in the reaction step. When the acceptor employed is the unchlorinated form of the organoamine reactant, the hydrochloride salt in solution is converted to the N-chloroamino organic reactant. Thus, the hydrochloride salt can be reacted with either chlorine gas and alkali or an alkali metal hypochlorite solution. Since the N-chloroamino organic reactant is not soluble in water, a solvent can be added to the chlorination reaction mixture to dissolve the N-chloroamino organic compound to facilitate recovery thereof. The solvent which can be employed is that which was previously separated from the sulfenamide product.

The presence of MBTS in the sulfenamide products can be easily determined by mixing the product with methanol. The sulfenamides are soluble in methanol while MBTS is insoluble in methanol.

The following examples are intended to illustrate the process of the present invention and are not intended to limit the same.

EXAMPLE 1

To a one liter flask equipped with a stirrer for agitation and a cooling bath was added 62 g. (0.70 mole) of morpholine containing 0.8 g. of water. With stirring, dry MBTS powder was added to the mixture in the flask and after about 0.15 mole of MBTS had been added, the addition of a solution of N-chloromorpholine in monochlorobenzene (concentration=1.62 moles/liter) was begun. A total of 220 ml. of N-chloromorpholine solution (0.358 mole) was added over 30 minutes. MBTS powder was added simultaneously with the addition of N-chloromorpholine solution. During the addition of the reactants 5 grams of sodium carbonate powder was added. The temperature of the reaction mixture was allowed to rise to 50°

C. and some cooling was needed to maintain this temperature. A total of 118 g. (0.355 mole) of MBTS was added.

The reaction endpoint was checked by spotting a drop of the reaction mixture on Starch-Potassium Iodide paste. A slight excess of N-chloromorpholine was detected by the appearance of a blue coloration on the Starch-KI paste as the last of the N-chloromorpholine solution was added, but this was discharged quickly by the addition of less than 1 gram of MBTS powder.

The reaction mixture, consisting of a light suspension of insoluble morpholine hydrochloride and inorganic salts in a solvent solution of sulfenamide product, was extracted by adding 65 ml. of warm water at 50° C., stirring for 5 minutes, then settling to produce two separate liquid layers. The heavier product layer was drained from the aqueous extract layer and the solvent evaporated at a pressure of 1–20 mm. Hg absolute and 90–100° C. The solvent was condensed and recovered for reuse. The molten product, 2-(morpholinothio) benzothiazole, was cooled to solidify. The yield was 175.4 g. (0.70 mole). Analysis of the product showed a purity of 96.0% and the methanol insoluble content, as a method for measuring MBTS concentration, was 0.00%. The product was aged for 3 months at 100° F. (37.8° C.) and after that time still showed zero methanol insoluble content. When aged at 122° F. (50° C.) the methanol insolubles content was zero after 20 days and 0.05% after 37 days.

EXAMPLE 2

A 1 liter three neck flask was equipped with a stirrer, cooling bath and thermometer. The recycled aqueous extract of morpholine hydrochloride from the previous batch was stirred with 160 ml. of monochlorobenzene, then with cooling to hold the temperature below 15° C., there was added 180 ml. of aqueous sodium hypochlorite solution of 15 g./100 ml. strength.

The resulting 195 ml. of solution of N-chloromorpholine in monochlorobenzene was separated from the brine layer by decantation and then used in the reaction with MBTS and morpholine.

A flask with a mechanical stirrer was charged with 58 g. of morpholine (0.67 mole) containing 0.8 g. of water. Dry MBTS powder was added to the morpholine, and after 50 grams had been added, the addition of N-chloromorpholine solution was begun. The two reactants, MBTS and N-chloromorpholine were added simultaneously over 30 minutes. At all times until at the end of the addition period the MBTS was in excess over that needed for reaction with the morpholine and N-chloromorpholine available in the flask. A spot test on Starch-KI paste confirmed the absence of an excess of N-chloromorpholine in the reaction mixture. During the addition of MBTS, 4 grams of powdered sodium carbonate was added to the flask. The total amount of MBTS used was 111.5 g. (0.336 mole). The reaction temperature was allowed to rise to 50° C. When the reactions were complete, 15 minutes after adding the last of the N-chloromorpholine and MBTS, the water soluble content was extracted by the addition of 65 ml. of warm water. The aqueous layer was separated from the solvent solution of product by settling and decantation. The aqueous solution was used as source of morpholine for chlorination in another batch. The product layer was evaporated under vacuum at 90–100° C. to yield 164.0 g. (0.652 mole) of molten 2-(morpholinothio) benzothiazole which was poured in a thin layer on a cold surface and after solidification scraped off to form thin flakes. The yield was 97% from MBTS and over 95% from the morpholine consumed and not recovered. The purity was 96.3% and the product after one month at 122° F. was completely free of any methanol insolubles. A sample stored at 100° F. for 3 months was also free of any methanol insolubles.

EXAMPLE 3

This example shows the effect of an excess of N-chloromorpholine in the mixture while MBTS is reacted with N-chloromorpholine and morpholine.

To a three neck 1 liter flask with mechanical stirrer, cooling bath and thermometer was added 125 ml. of monochlorobenzene and 120 ml. of aqueous morpholine hydrochloride solution containing the equivalent of 37.5 g. (0.43 mole) of morpholine. With cooling there was added 220 ml. of sodium hypochlorite solution containing 34 g. of NaOCl. The aqueous brine layer was separated from the solvent solution of N-chloromorpholine. A total of 165 ml. of solution containing 0.38 mole of N-chloromorpholine was taken and mixed with 67 g. (0.77 mole) of morpholine and 1.5 ml. of water in stirred 1 liter flask. To this mixture was added, over 45 minutes, a total of 125 g. (0.38 mole) of MBTS. The reaction temperature was kept at 45–50° C. During the addition of MBTS, 4 g. of powdered sodium carbonate was added to the reaction mixture. After the last of the MBTS had been added a test for the presence of N-chloromorpholine by means of spotting on Starch KI paste was negative. The water soluble salts were extracted by the addition of 70 ml. of warm water. The solvent layer containing the product was separated from the aqueous layer by decantation and the solvent evaporated at 90–100° C. under 1 mm. Hg absolute pressure. Analysis of the product, 2-(morpholinothio) benzothiazole, showed zero methanol insolubles content. When aged for 5 days at 122° F. (50° C.) the product showed 0.52% methanol insolubles. After 40 days at 122° F. the methanol insolubles had increased to 1.5%.

EXAMPLE 4

To demonstrate the undesirable effect of only a small amount of ammonia in the reaction medium, a preparation was made following the method of Example 1 with the exception of replacing of the 5 g. of sodium carbonate powder with the addition of 1.35 g. of anhydrous ammonia gas. The reaction proceeded normally with no excess N-chloromorpholine detected until a very slight excess was added at the end, this excess being discharged quickly with a small increment of MBTS powder. The product obtained after washing salts from the solvent layer and evaporating the solvent was in quantitative yield and assayed as 96.0% 2-(morpholinothio) benzothiazole. The methanol insolubles content was 0.00%. After storage for 15 days in an oven at 122° F. (50° C.) the product was analyzed and contained 0.20% methanol insolubles. After 3 months at 100° F. the methanol insolubles content was 0.92%.

EXAMPLE 5

This example further illustrates the undesirable effects of ammonia and excess N-chloromorpholine during reaction.

A 1 liter reaction flask was fitted with a mechanical stirrer, a thermometer, a gas leg for adding ammonia, and a water bath for controlling temperature. A solution of 29 g. of morpholine in 210 ml. of monochlorobenzene was chlorinated by the addition of 180 ml. of sodium hypochlorite solution of 15.5 g./100 ml. concentration meanwhile cooling to 10–15° C. The aqueous brine was separated and discarded. The N-chloromorpholine solution was mixed with 39 g. of morpholine and the mixture stirred while MBTS powder was added. A total of 112 g. of MBTS was added over 1 hour while cooling to hold the temperature at 35–45° C. After half of the MBTS had been added, the reaction mixture was saturated with anhydrous ammonia gas and again after ¾ of the reaction period ammonia was added. When all of the MBTS had been added only a small excess of N-chloromorpholine was evident by a spot test on Starch KI paste. After a final saturation with ammonia gas for 5 minutes, the reaction was complete and no excess N-chloromorpholine evident. The ammonium chloride crystals were filtered off and the product isolated by evaporation of the monochlorobenzene and excess morpholine under vacuum at 90–100° C. The solid product, 2-(morpholinothio) benzothiazole, was 96% pure. It contained 0.45% methanol insolubles. After storage at 122° F. (50° C.) for 7 days, the methanol insolubles content had increased to 1.44%.

EXAMPLE 6

An aqueous solution of 9.405 moles of cyclohexylamine hydrochloride in a total volume of 113 ml. was stirred in a one liter flask, cooled to 5° C., with 120 ml. of monochlorobenzene. With cooling to hold the temperature at 0 to 5° C., 120 ml. of a solution of sodium hypochlorite containing 18.6 g. of available chlorine per 100 ml. is added over 40 minutes. The lighter organic solution of N-monochlorocyclohexylamine is separated from the heavier brine layer by settling and decanting.

To a one liter flask with mechanical stirrer, thermometer and water bath for temperature control is added 62 g. (0.625 mole) of cyclohexylamine. Dry MBTS powder is added to the cyclohexylamine. After adding 30 g. of MBTS the addition of the N-monochlorocyclohexylamine solution was begun. A total of 167 ml. of solution containing 0.315 moles of N-monochlorocyclohexylamine was added simultaneously with MBTS to a total of 0.31 mole. The temperature of the reaction mixture was allowed to rinse no higher than 50° C., some cooling being necessary. During the addition of reactants there was no excess N-chloro compound present in the mixture as evidenced by a lack of a blue spot reaction on Starch-KI paste. As the last of the solution was added a slight excess is shown, and this was carefully discharged with a small amount of MBTS.

The final reaction mixture was a thick slurry of cyclohexylamine hydrochloride in a solvent solution of sulfenamide product. After the addition of 50 ml. of warm water, the resulting two liquid phases at 45° C. were separated. The lighter aqueous layer was saved for use in the next chlorination batch. The heavier organic layer was evaporated at 110° C. under an absolute pressure of 1–20 mm. Hg to recover the solvent and the non-volatile product and was poured onto a cool surface to solidify. The product N-cyclohexyl-2-benzothiazolesulfenamide, weighing 153 g. (0.58 mole) crystallized very easily to form thin dust-free flakes when scraped off the surface. The product analyzed 94.8% pure and contained no methanol insolubles. After storage for 3 months at 100° F. the methanol insolubles content was only 0.13%.

EXAMPLE 7

The aqueous extract of the hydrochloride of cyclohexylamine and the recovered monochlorobenzene solvent from the above preparation were combined in a one liter stirred flask, cooled with an ice water bath, and 120 ml. of solution 0.30 mole of sodium hypochlorite was added. The temperature was kept at 0 to 3° C. The two phases were separated by decantation and the brine layer discarded. The organic layer, a solution of N-monochlorocyclohexylamine was used in the reaction with MBTS in the presence of cyclohexylamine.

To a one liter stirred flask was charged 62 g. (0.625 mole (of cyclohexylamine containing 2 g. of water. After an initial amount of 25 g. of MBTS was added, the N-chlorocyclohexylamine solution and MBTS were added concurrently over a period of 30 minutes. A total of 101 grams of MBTS was used. The reaction endpoint was adjusted by providing a slight excess of N-chloro compound at the end of the addition period, which was discharged quickly with the last increment of MBTS. Midway in the reaction period, 3.0 grams of powdered sodium hydroxide was added. The reaction slurry remained thin and easily stirred. The temperature was controlled at 45–50° C. with some cooling.

The water soluble salts were extracted by adding 50 ml. of warm water, stirring and settling the two phase mixture. The heavier product layer was separated, then evaporated under vacuum at 110° C. to recover the solvent monochlorobenzene. The yield was 154.6 g. N-cyclohexyl-2-benzothiazolesulfenamide, representing 97% yield from MBTS and 94% yield from cyclohexylamine. The product flaked easily when solidified on a cool surface and contained 0.01% methanol insolubles.

On storage at 100° F. the product showed an increase in methanol insolubles of only 0.27% in three months.

EXAMPLE 8

This example illustrates the undesirable effects of employing excess N-chlorocyclohexylamine during reaction.

To 250 ml. of monochlorobenzene is added 59 g. (0.596 mole) of cyclohexylamine and 75 ml. of water. The mixture is stirred, cooled to 0 to 5° C. and 105 ml. of sodium hypochlorite solution of 15.8 g./100 ml. strength is added over one hour. The organic layer of N-monochlorocyclohexylamine solution is separated from the heavy brine layer and to this is added, while stirring at 5–11° C., enough MBTS to react with all of the chloroamine (76 g. or 0.23 mole). The reaction mixture is saturated with anhydrous ammonia gas. The endpoint on MBTS addition is checked by spotting on Starch-KI paste. After reaction the mixture is heated to 40° C. and the ammonium chloride crystals were filtered from the solution of product in monochlorobenzene. The solution was evaporated at 105–110° C. under 1 mm. Hg pressure for ½ hour. The molten product, N-cyclohexyl-2-benzothiazolesulfenamide, weighing 110.2 g. (0.451 mole) was flaked after solidifying on a cool surface. The product analyzed 92.7% pure and contained 0.01 methanol insolubles. After three months storage at 100° F. the methanol insolubles content had increased to 1.10%.

EXAMPLE 9

An aqueous extract layer containing 29 grams (0.397 mole) of t-butylamine as the hydrochloride was chlorinated in the presence of 300 ml. of monochlorobenzene by the addition of 165 ml. of sodium hypochlorite solution of 18 g./100 ml. concentration, while cooling to hold the temperature below 5° C. The aqueous brine was separated from the organic layer. The organic layer was reacted with MBTS and t-butylamine in a manner similar to Example 7. To a mixture of 50 ml. of monochlorobenzene and 61 g. of t-butylamine was added MBTS powder, following by simultaneous addition of MBTS and the solution of N-monochloro-t-butylamine from above over a period of one hour. There was a deficiency of the chloroamine in the mixture until at the endpoint when a slight excess (just enough to give a light blue spot on Starch-KI paste) was allowed to show for several minutes before being discharged with the last increment of the total of 137 grams of MBTS used. The reaction temperature was held to 30–35° C. with cooling.

The reaction slurry was extracted by adding 50 ml. of warm water, stirring at 40–45° C., then settling to separate the two liquid layers.

The product layer was evaporated at 110–115° C. and 1 mm. Hg absolute pressure. The molten product, N-(t-butyl)-2-benzothiazolesulfenamide, after removal of solvent was poured in a thin layer to solidify and then scraped off as flakes. The yield was 190.7 grams. The methanol insolubles content was 0.01%. After storage for three months at 100° F. the methanol insolubles content increased to 0.5%.

I claim:

1. A process for making a sulfenamide represented by the formula:

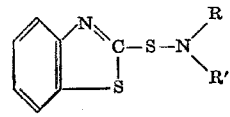

wherein R is a member selected from the group consisting of hydrogen, lower alkyl and together with R' can form an N-heterocycle moiety, and R' is a member selected from the group consisting of lower alkyl, cycloalkyl and an N-heterocycle moiety formed with R, which comprises reacting in equimolar amounts: (a) a benzothiazole selected from the group consisting of 2-mercaptobenzothiazole and 2,2'-dithiobisbenzothiazole with (b) an N-chloroamino organic reactant represented by the formula:

while maintaining an excess of said benzothiazole by carefully adding the N-chloroamino organic reactant to the benzothiazole until reaction is substantially complete, said reaction taking place in the presence of a hydrogen chloride acceptor which is the amine precursor of the N-chloroamino organic reactant.

2. The process of claim 1 wherein the reaction is conducted in the presence of an anhydrous alkali metal or alkaline earth metal carbonate, bicarbonate or hydroxide.

3. The process of claim 1 wherein the N-chloroamino organic reactant is N-chloromorpholine.

4. The process of claim 1 wherein the N-chloroamino organic reactant is N-chloro-t-butylamine.

5. The process of claim 1 wherein the N-chloroamino organic reactant is N-monochlorocyclohexylamine.

6. The process of claim 1 wherein the hydrochloride derivative of the hydrogen chloride acceptor produced during reaction is recovered and converted to the N-chloroamino organic reactant.

7. The process of claim 6 wherein the hydrogen chloride acceptor is morpholine.

8. The process of claim 6 wherein the hydrogen chloride acceptor is t-butylamine.

9. The process of claim 6 wherein the hydrogen chloride acceptor is cyclohexylamine.

References Cited
UNITED STATES PATENTS

| | | | |
|---|---|---|---|
| 2,772,278 | 11/1956 | Hardman | 260—306.6 |
| 2,730,527 | 1/1956 | Kinstler | 260—247.1 |
| 3,142,684 | 7/1964 | Hardman | 260—306.6 |

ALEX MAZEL, Primary Examiner

B. DENTZ, Assistant Examiner

U.S. Cl. X.R.

260—306.6 A, 293.57